(12) United States Patent
Patterson

(10) Patent No.: US 8,035,357 B2
(45) Date of Patent: Oct. 11, 2011

(54) FAULT CLEARING FOR PERMANENT MAGNET MACHINES

(75) Inventor: Stanley C. Patterson, Fall City, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 0 days.

(21) Appl. No.: 12/977,281

(22) Filed: Dec. 23, 2010

(65) Prior Publication Data
US 2011/0149445 A1 Jun. 23, 2011

Related U.S. Application Data

(62) Division of application No. 12/380,326, filed on Feb. 26, 2009, now Pat. No. 7,880,448.

(60) Provisional application No. 61/069,512, filed on Mar. 14, 2008.

(51) Int. Cl.
*H02P 9/14* (2006.01)

(52) U.S. Cl. .......... 322/46; 322/45; 322/33; 322/47

(58) Field of Classification Search .............. 322/46, 322/47, 45, 33
See application file for complete search history.

(56) References Cited

U.S. PATENT DOCUMENTS

| | | | | |
|---|---|---|---|---|
| 4,695,776 A | * | 9/1987 | Dishner et al. | 318/14 |
| 4,868,406 A | * | 9/1989 | Glennon et al. | 290/4 R |
| 5,493,200 A | | 2/1996 | Rozman et al. | |
| 5,512,811 A | * | 4/1996 | Latos et al. | 322/10 |
| 5,594,322 A | | 1/1997 | Rozman et al. | |
| 5,929,537 A | | 7/1999 | Glennon | |
| 6,700,214 B2 | * | 3/2004 | Ulinski et al. | 290/40 C |
| 6,787,933 B2 | * | 9/2004 | Claude et al. | 290/52 |
| 6,844,707 B1 | * | 1/2005 | Raad | 322/29 |
| 7,064,526 B2 | | 6/2006 | Patterson | |
| 7,242,167 B2 | | 7/2007 | Patterson | |
| 7,327,123 B2 | * | 2/2008 | Faberman et al. | 322/37 |
| 7,365,521 B2 | | 4/2008 | Patterson | |
| 7,372,174 B2 | * | 5/2008 | Jones et al. | 290/44 |
| 7,388,311 B2 | | 6/2008 | Bhargava | |
| 7,511,385 B2 | * | 3/2009 | Jones et al. | 290/43 |
| 7,629,699 B2 | | 12/2009 | Annen et al. | |
| 7,646,178 B1 | | 1/2010 | Fradella | |
| 7,656,252 B2 | | 2/2010 | Inaba et al. | |

* cited by examiner

*Primary Examiner* — Tulsidas C Patel
*Assistant Examiner* — Iraj A Mohandesi
(74) *Attorney, Agent, or Firm* — Wiggin and Dana LLP; Gregory S. Rosenblatt

(57) ABSTRACT

A permanent magnet machine (PMM) has a kinetic portion electrically coupled to a power conversion portion. Motive power is provided to the kinetic portion by a torque applied to a motive shaft coupled to a prime mover, such as an aircraft engine or an automobile engine. A sensor is effective to detect a fault condition in the kinetic portion. When a fault is detected, the sensor applies a voltage to a winding within the kinetic portion generating an opposing directional counter torque to the motive shaft. A combination of the torque and counter torque exceeds a fracture yield strength of the motive shaft. The fault condition is then rendered safe while the prime mover may continue normal operation.

6 Claims, 3 Drawing Sheets

FAULT CLEARING FOR PERMANENT MAGNET MACHINES

CROSS REFERENCE TO RELATED APPLICATIONS

This patent application claims priority to U.S. patent application Ser. No. 12/380,326 that was filed on Feb. 26, 2009 and to Provisional Patent Application Ser. No. 61/069,512 that was filed on Mar. 14, 2008; both titled "Fault Clearing Method for Permanent Magnet Machines". The disclosures of U.S. patent application Ser. No. 12/380,326 and U.S. Provisional Patent Application Ser. No. 61/069,512 are incorporated by reference in their entireties herein. This patent application is related to commonly owned U.S. Pat. Nos. 7,064,526, 7,242,167 and 7,365,521 all titled "Fault Tolerant Architecture for Permanent Magnet Starter Generator System." The disclosures of U.S. Pat. Nos. 7,064,526, 7,242,167 and 7,365,521 are incorporated by reference in their entireties herein.

U.S. GOVERNMENT RIGHTS

N. A.

BACKGROUND OF THE INVENTION

1. Field of the Invention

This invention relates to a fault clearing control circuit for a permanent magnet machine. More particularly, fault sensors are provided that identify and localize a fault. Dependent on type and location of fault, proper remedial action is taken.

2. Description of the Related Art

A permanent magnet machine (PMM) has a number of advantages over other types of motors and electrical power generation and/or engine starting systems commonly used on aircraft. The PMM is typically smaller, lighter and more efficient than brushed starter generators and other typical brushless machines used in aircraft applications. The PMM also typically requires less maintenance and exhibits much higher reliability than other commonly used aircraft machines such as starter/generator machines using brushes. The brushed starter/generator also typically exhibits significant reductions in generator capability when required to operate over wide speed ranges as is often required in aircraft applications (e.g., typically 50% to 100% speed range operation is required in small aircraft generator applications). Whereas the PMM configured for use as a permanent magnet alternator (PMA), permanent magnet generator (PMG), and/or permanent magnet starter/generator (PMSG) is typically capable of operating over wide speed ranges with less weight and/or performance penalty. In summary, a PMM, PMA, PMG or PMSG subsystem typically offers significant improvements in reliability, weight, size, performance, and maintenance requirements relative to other commonly used motors, alternators, generators or starter/generators.

A disadvantage of the PMM is the output voltage cannot be controlled by means of adjusting a field excitation (which is a common control technique used with brushed machines), and therefore the output cannot be electronically disabled in the event of a fault. The inability to disable output power during fault mode operation is of particular concern in high reliability applications such as aircraft power systems.

A voltage breakdown in the feeder cable to engine or aircraft structure can result in a hazardous or unsafe condition for typical aircraft generation and distribution systems. However, that type of fault can be relatively easily mitigated by use of contactors, thermal switches or fuses in series with the feeder cable. Another method to mitigate this type of fault is to design the PMA, PMG or PMSG with high series reactance as described in U.S. Pat. No. 7,064,526 by Patterson and U.S. Pat. No. 7,365,521 by Patterson.

A fault within the PMA, PMG or PMSG cable, load or internal winding may result in a thermal runaway condition that can cause a fire within the machine if that fault is not mitigated in some manner. These faults cannot always be mitigated by use of a series fuse, switch or contactor. Nor is a turn-to-turn fault within a winding of the stator readily mitigated by the method disclosed in U.S. Pat. No. 7,365,521. Furthermore, the extreme response of shutting down the prime mover is not an acceptable alternative for fault mitigation in many aircraft applications.

There remains a need for a fault clearing method for permanent magnet machines that does not have the limitations of the prior art methods.

BRIEF SUMMARY OF THE INVENTION

The details of one or more embodiments of the invention are set forth in the accompanying drawings and the description below. Other features, objects and advantages of the invention will be apparent from the description and drawings, and from the claims.

Disclosed is a method for clearing a fault within a permanent magnet machine when operated in conjunction with a power control unit (PCU). The PMM and PCU can be configured for operation as a motor, alternator, generator, starter/generator or other type of subsystem requiring fault tolerant operation. The fault clearing method utilizes fault monitoring functions and fault clearing functions within the PMM and PCU. In one embodiment, the drive shaft for the PMM rotor is configured with a shear section such that the shaft will break when exposed to a predefined level of torque stress. The fault clearing method utilizes energy generated within the PMM as the source of electrical power to generate the torque required to break the drive shaft. This method of fault clearing is used to prevent a hazardous condition such as thermal runaway and/or a fire which results due to faults internal and/or external to the PMM. This fault clearing method does not require shut down of the prime mover and is compatible with and may be used as an integral element of a fault tolerant power system architecture, such as described in U.S. Pat. No. 7,064,526.

BRIEF DESCRIPTION OF THE DRAWINGS

Like reference numbers and designations in the various drawings indicate like elements.

DETAILED DESCRIPTION

Figure 1:
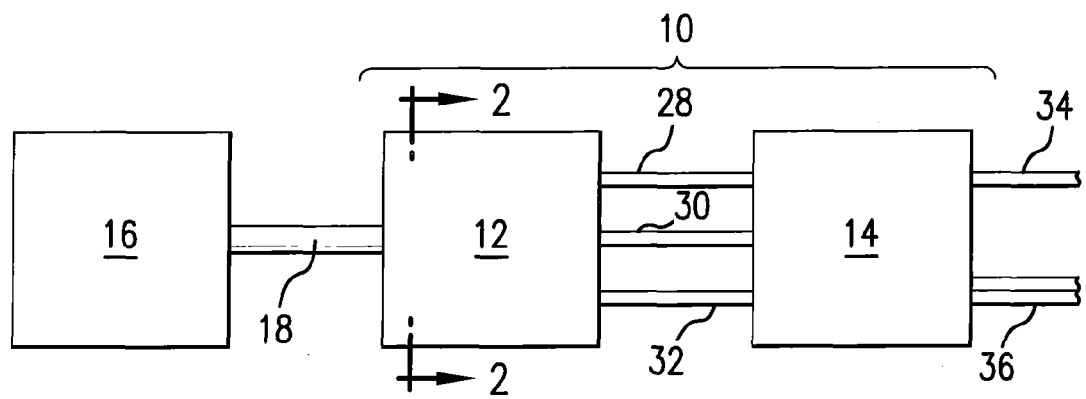
FIG. 1 illustrates the components of a permanent magnet machine in block form.

FIG. 1 illustrates the components of a permanent magnet machine 10 that includes a kinetic portion 12 and a power conversion portion 14. The kinetic portion 12 is effective to transform motive energy to electric energy and electric energy to motive energy. Exemplary kinetic portions include PMAs, PMGs and PMSGs. The power conversion portion is effective to transform electric energy received from the kinetic portion to a form useful to external devices, such as aircraft lighting, and to transform electric energy received from an external device, such as a battery, to a form useful for the kinetic portion 12.

A prime mover 16 is coupled to the PMM 10 by a motive shaft 18. Exemplary prime movers are an aircraft engine and an automobile engine. During start up, the motive shaft is powered by the PMM and provides start-up power to the prime mover 16. During normal operation, the motive shaft 18 is powered by the prime mover 16 enabling the PMM to generate power for use by an external device.

Figure 2:
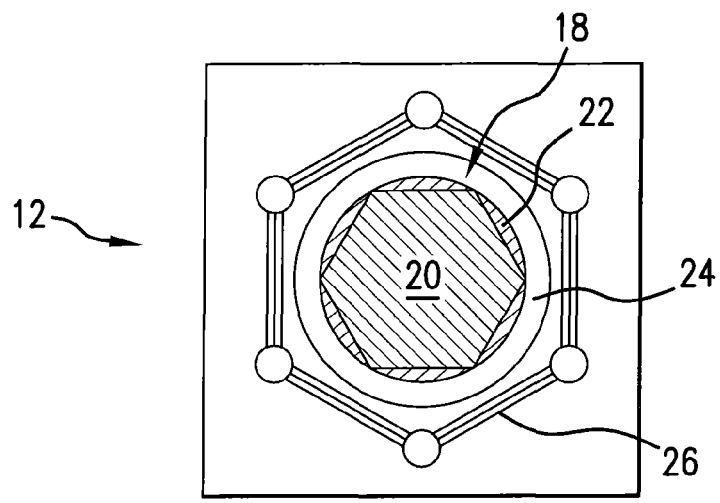
FIG. 2 illustrates a permanent magnet motor in cross sectional representation.

FIG. 2 is a cross-sectional view of the kinetic portion 12 as an exemplary PMSG. The motive shaft 18 has a core 20 and a plurality of magnetic pole pieces 22 of alternating polarity. Surrounding the motive shaft 18 and separated from it by an air gap 24 are a plurality of wound wire coils 26. When operated as a starter, a current is applied to the wire coils 26 from an external power source, such as a battery. The resultant magnet field causes the motive shaft 18 to rotate, providing kinetic energy to the prime mover. When operated as a generator, rotation of the motive shaft 18 by the prime mover creates a magnetic field that induces a current in the wire coils 26. This current is then conducted to the power conversion unit.

Six isolated wire coils 26 are effective to generate three phases of alternating current. A preferred embodiment, as disclosed in U.S. Pat. No. 7,064,526 delivers each phase to a separate converter in the power conversion unit 14 by a separate pair of conductors, 28, 30, 32. Dependent on processing in the power conversion unit or the source of external power, power to/from the power conversion unit may be direct current 34 or alternating current 36.

Figure 3:
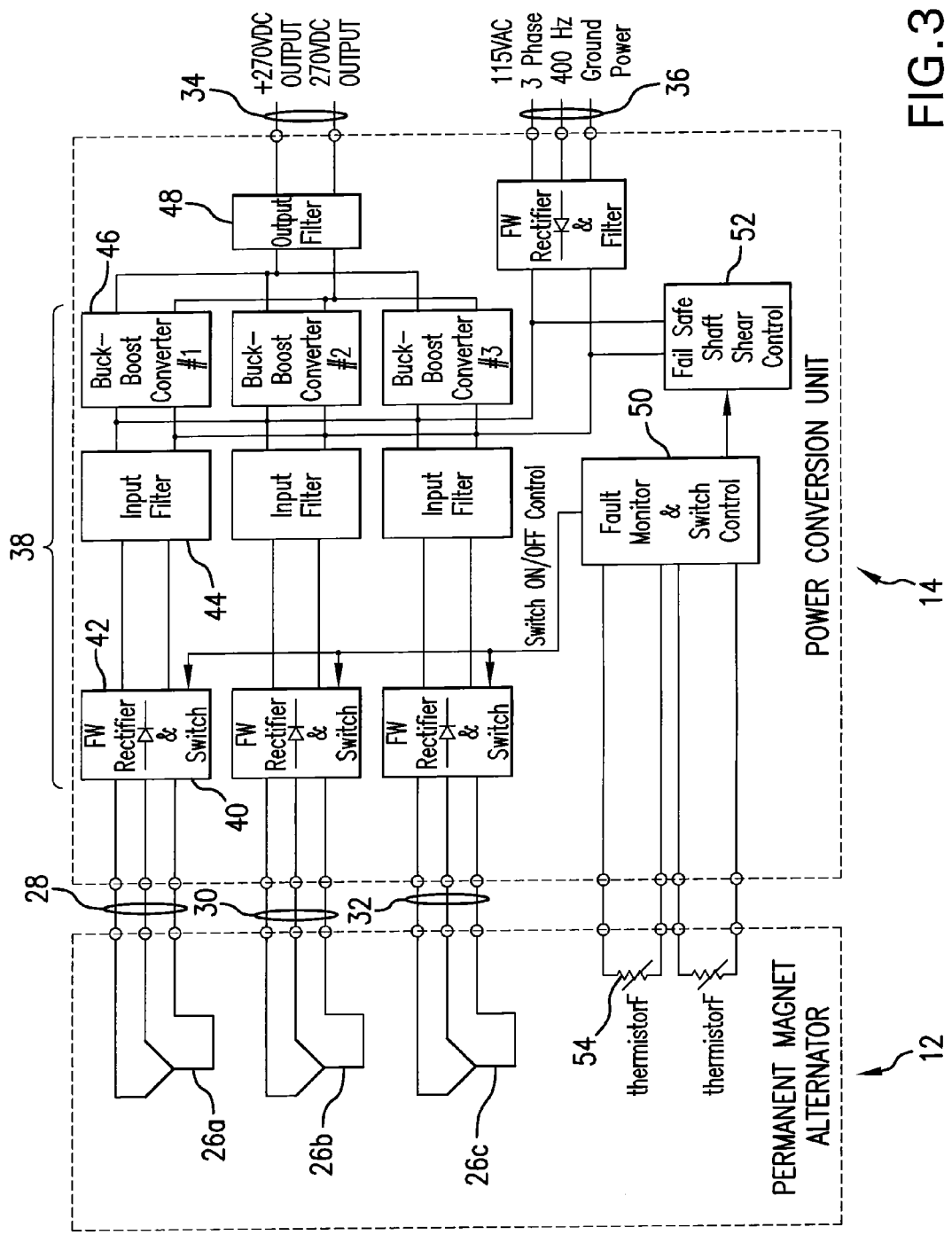
FIG. 3 illustrates a circuit diagram for the permanent magnet machine including fault clearing embodiments as described herein.

A simplified block diagram of a typical kinetic portion 12 and power conversion portion 14 electrical power generation subsystem is illustrated in FIG. 3. The fault tolerant architecture provides enhanced performance features as described herein. Each of the three windings 26a, 26b, 26c is electrically coupled to an associated converter module 38a, 38b, 38c. With each coupled pair of a winding and converter module being electrically and physically isolated from the other coupled pairs. During normal operation, power generated in the kinetic portion 12 flows through phase 1 conductor 28, phase 2 conductor 30 and phase 3 conductor 32. When switch 40 is closed, the current flows through forward rectifier 42 to input filter 44 where a DC voltage is established to operate the converter 46. The DC voltage is used to provide power to the input filter 44 and buck-boost converter 46 where it is converted to the desired output voltage form. Through these steps, power is converted to the desired output form and each phase remains electrically and physically isolated. The three phases are then electrically and physically combined in output filter 48 to exit via DC power 34 feeder cable. For typical aircraft applications, the desired DC output voltage is 28 volt DC, 48 volt DC and/or 270 volt DC.

The power conversion portion 14 provides regulated DC output power 34 and is capable of operation even in the presence of one or more faults. The power conversion portion includes a fault monitor function 50 that controls the rectifier switch 40 and a shorting circuit function 52. If a fault is detected in a feeder cable or in the power conversion unit 14, the rectifier switch 40 associated with that winding 26 is opened, stopping the flow of current through the faulty circuit. The generator system continues to provide power to the load (at a reduced capacity).

If a fault is detected within the kinetic portion 12 that has potential to result in a hazardous condition such as a fire, the fault monitor 50 initiates a short within the shorting circuit 52 applying a current to one of the windings 26a, 26b, 26c. This produces a significant counter torque and the motive shaft associated with the faulty circuit is broken at a shear section. Sufficient counter torque is developed in this case utilizing just one of the windings 26 and one shorting circuit. The kinetic portion 12 output power is used to provide the energy required to develop the torque to break the shear neck shaft.

The fault clearing method includes a motive shaft with a shear section. Temperature sensors 54 and fault detecting sensors may be positioned within the kinetic portion 12, the output 34 feeder cables and/or the power conversion portion 14. Some or all of the fault monitoring functions may be incorporated into the kinetic portion and some or all may be incorporated into the power conversion portion.

A fault condition that requires mitigation (such as a runaway over-temperature condition that may cause a fire) is detected by the fault monitor and a low impedance "short" is applied to the windings 26. The "short" applied to the windings produces a counter torque sufficient to cause the motive shaft to break at the shear section. The "short" may be applied internal to the kinetic portion or externally (such as internal to the power conversion portion) and may be implemented with power semiconductors and associated control circuits or by electromechanical devices and associated control circuits. The "short" produces sufficient counter torque to break the shear section of the motive shaft at or above a defined speed threshold (typically at speeds of approximately 10% of the normal operating speed or greater in many PMM applications)

Figure 4:
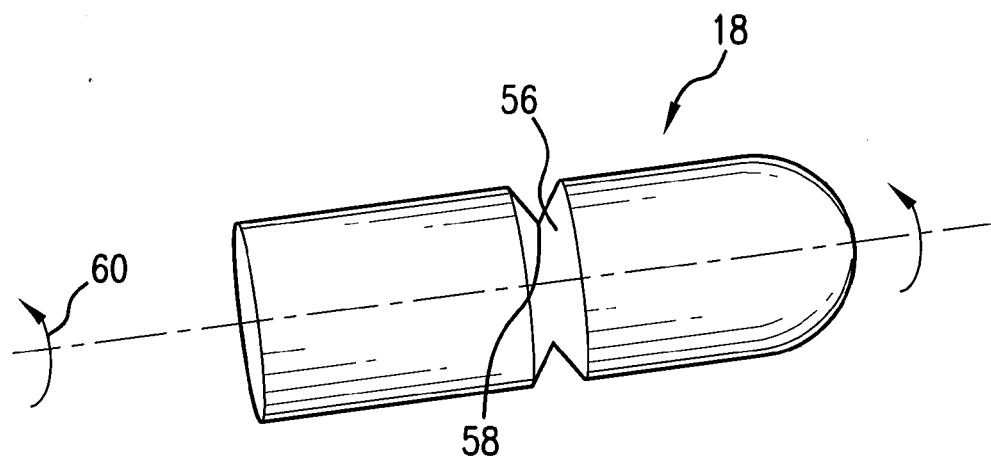
FIG. 4 illustrates a portion of a motive shaft component of the permanent magnet machine during normal operation.
Figure 5:
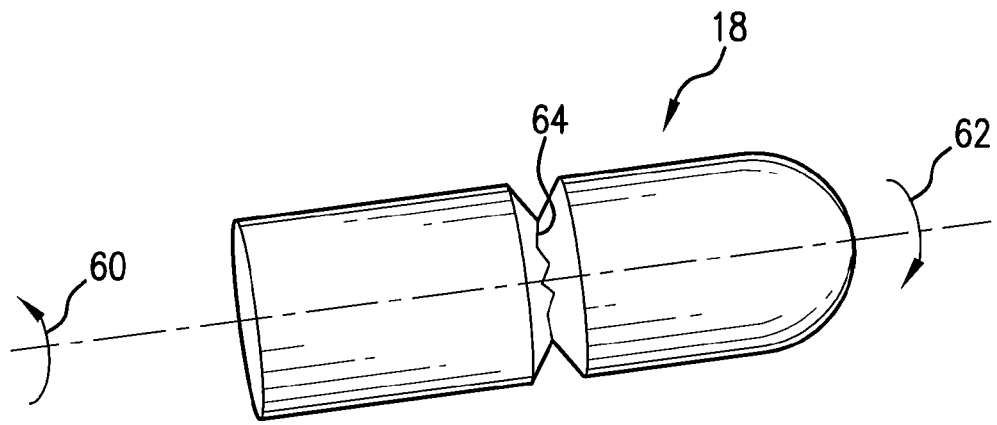
FIG. 5 illustrates a portion of the motive shaft component of the permanent magnet machine during fault clearing.

FIG. 4 illustrates a motive shaft 18 during routine operation. The motive shaft 18 includes a shear section 56, such as a notch having a crack propagating apex 58. Proper selection of notch dimensions and apex angle enable tailoring the fracture yield strength of the motive shaft. During normal operation, the prime mover (not shown) applies a torque 60 rotating the motive shaft 18. With reference to FIG. 5, if a fault condition, identified as a potential fire hazard is detected, the shorting circuit causes a counter torque 62 to be applied to the motive shaft 18. The combination of torque 60 and counter torque 62 is sufficient to cause a crack 64 to propagate causing the motive shaft to break. As a result, electric power is not longer produced removing the hazard condition, but the prime mover continues to operate normally.

Advantages of this method of fault clearing include:

PMM is significantly lighter and smaller than equivalent performance high reactance or fault tolerant configuration machine;

PMM is significantly more efficient and less costly to produce than the equivalent performance high reactance or fault tolerant configuration machine;

faults within the PMM are very effectively mitigated with this method (as well as external faults); and shut down of the prime mover is not required with this fault clearing method.

This fault clearing method is compatible with fault tolerant system architectures such as described in U.S. Pat. No. 7,064, 526, including use of multiple isolated windings, use of redundancy in the PMA, PMG, PMSG and/or PCU functions.

PCU may be designed so that a failure in one power converter will not propagate to or degrade the generator mode performance of other power converters PMA, PMG, PMSG and PCU may be designed such that generator mode operation is achieved even in the event of a failure of up to "n−1" phases of an "n" phase PMA, PMG, PMSG and/or simultaneous failure of up to "n−1" phases of a PCU with "n" converter modules PMA, PMG, PMSG and PCU may be designed such that each phase is electrically and physically isolated PMA, PMG, PMSG and/or PCU may be designed to continuously monitor for and detect a ground fault condition within any phase of the PMA, PMG, PMSG and/or PCU; the ground fault detection function is fully testable, and thus a complete end-to-end functionality verification of the ground fault detection circuit can be performed PCU may use multiple, parallel solid-state switching devices so that high performance and high reliability operation is achieved, as well as fault tolerant operability within each PCU converter The PMA, PMG and/or PMSG can be configured as a bearingless machine using a gearbox integrated design, provided the drive shaft extension includes a shear neck design The fault clearing and fault tolerant architecture applications include:

aircraft and/or automotive applications requiring engine start operation and generation of DC electrical power;

aircraft and/or automotive applications requiring engine start operation and generation of AC electrical power; and aircraft and/or automotive applications requiring engine start operation and generation of DC and AC electrical power.

The PMM can be designed for operation as:

integral assembly to engine shaft (i.e., PMM rotor rotates at same speed as main or auxiliary engine shaft; no bearings are required);

shaft mounted, gearbox integrated assembly (i.e., PMM rotor is mounted directly to driveshaft on engine accessory gearbox (AGB); no bearings are required); and AGB mounted assembly (i.e., PMM rotor is typically mounted to a shaft and incorporates bearings so that the assembly interfaces to engine AGB in similar or identical fashion to conventional brushed starter/generators).

An optional switch or contactor can be added in series with the PMM stator winding to remove power from the feeder cables and/or PCU input. The use of this switch/contactor is optional with the "fault tolerant" architecture.

PCU can be designed for operation as:

single assembly located adjacent to or remote from PMM;

multiple assemblies located adjacent to or remote from PMM;

PCU/PMM is interconnected via low current feeder cable (i.e., PMM voltage is greater than average bus voltage); and PCU/PMM is interconnected via high current feeder cable (i.e., PMM voltage is equal or less than average bus voltage).

One or more embodiments of the present invention have been described. Nevertheless, it will be understood that various modifications may be made without departing from the spirit and scope of the invention. For example, a different type of converter 46 may be used to convert the machine voltage to the desired output form and this converter may be electrically isolated or non-isolated from the machine voltage. Accordingly, other embodiments are within the scope of the following claims.

What is claimed is:

1. A control circuit for a permanent magnet machine (PMM) having a kinetic portion electrically coupled to a power conversion portion, said control circuit comprising:

a motive shaft disposed between said kinetic portion and a prime mover, said prime mover effective to apply a first directional torque on said motive shaft; and a sensor effective to detect a fault condition in said kinetic portion, said sensor being effective to apply a voltage to a winding within said kinetic portion generating an opposing second directional counter torque to said motive shaft wherein a combination of said first directional torque and said second directional counter torque exceeds a fracture yield strength of said motive shaft.

2. The control circuit of claim 1 wherein said fault condition is a hazardous condition, including a fire potential.

3. The control circuit of claim 2 wherein said fault condition is an over-temperature.

4. The control circuit of claim 2 wherein said motive shaft includes a shear section effective to control said fracture yield strength.

5. The control circuit of claim 4 wherein said shear section include a notch.

6. The control circuit of claim 5 wherein said notch terminates at a crack propagating apex.

* * * * *